United States Patent
Walker

(10) Patent No.: US 9,365,370 B2
(45) Date of Patent: Jun. 14, 2016

(54) BULK MATERIAL STORAGE AND RECLAIM SYSTEM

(75) Inventor: Harold A. Walker, Jonesborough, TN (US)

(73) Assignees: Donna F. Walker, Johnson City, TN (US); Harold A. Walker, Johnson City, TN (US)

( * ) Notice: Subject to any disclaimer, the term of this patent is extended or adjusted under 35 U.S.C. 154(b) by 865 days.

(21) Appl. No.: 12/428,888

(22) Filed: Apr. 23, 2009

(65) Prior Publication Data

US 2010/0272543 A1    Oct. 28, 2010

(51) Int. Cl.
*B63B 27/22* (2006.01)
*B65G 65/42* (2006.01)
*B63B 27/00* (2006.01)

(52) U.S. Cl.
CPC ............... *B65G 65/42* (2013.01); *B63B 27/02* (2013.01)

(58) Field of Classification Search
CPC ........................................................ B63B 27/22
USPC ............ 414/140.8, 140.9, 142.1–142.4, 415, 414/375; 222/198, 202, 203; 198/533
See application file for complete search history.

(56) References Cited

U.S. PATENT DOCUMENTS

| | | | | |
|---|---|---|---|---|
| 860,942 | A * | 7/1907 | Schwartz | 414/142.4 |
| 2,170,258 | A * | 8/1939 | Borch | 222/202 |
| 3,584,748 | A | 6/1971 | Enfield et al. | |
| 4,072,238 | A * | 2/1978 | Vaughan | 414/141.9 |
| 4,125,970 | A | 11/1978 | Vidal | |
| 4,205,796 | A | 6/1980 | Evans | |
| 4,629,060 | A | 12/1986 | Schlegel et al. | |
| 4,706,854 | A * | 11/1987 | Pole | 222/459 |
| 4,738,578 | A | 4/1988 | Johnston | |
| 5,024,568 | A | 6/1991 | Johnston | |
| 5,702,221 | A * | 12/1997 | Sridhar | 414/142.3 |
| 5,785,483 | A | 7/1998 | Smyre | |
| 6,203,261 | B1 | 3/2001 | South et al. | |
| 6,390,006 | B1 * | 5/2002 | Sridhar | 114/73 |
| 6,558,111 | B2 * | 5/2003 | Wilson et al. | 414/810 |
| 6,832,455 | B1 * | 12/2004 | Tomlinson et al. | 52/259 |
| 7,008,163 | B2 | 3/2006 | Russell | |
| 2008/0131235 | A1 | 6/2008 | Laidig et al. | |

FOREIGN PATENT DOCUMENTS

| | | |
|---|---|---|
| CA | 1149580 | 7/1983 |
| CA | 1196881 | 11/1985 |
| EP | 0190038 A2 | 8/1986 |
| GB | 1154717 | 11/1969 |
| MX | 9703757 | 6/1998 |

* cited by examiner

*Primary Examiner* — Jonathan Snelting
(74) *Attorney, Agent, or Firm* — Peter L. Brewer; Baker Donelson IP

(57) ABSTRACT

Systems and methods for reclaiming bulk solid material from storage stockpiles or from watercraft. A storage and reclaim system includes a support surface for supporting a stockpile of bulk material. The support surface is defined by a plurality of individual material support structures geometrically arranged and positioned with reference to each other so that the support surface is essentially continuous. Each of the material support structures in turn includes a dish or funnel-like structure having a generally conical floor surface sloping towards an individual discharge opening fitted with a discharge control gate. An array of vibrators is mechanically connected to each of the material support structures so as to introduce vibrational energy into the dish or funnel-like structures sufficient to either avoid a stable reclaim cone or to destabilize a stable reclaim cone which may form in order to maintain material discharge flow.

18 Claims, 11 Drawing Sheets

BULK MATERIAL STORAGE AND RECLAIM SYSTEM

BACKGROUND OF THE INVENTION

The invention relates generally to reclaiming bulk solid material, such as coal, from storage stockpiles or from watercraft such as barges and ships used to transport bulk material.

Bulk material reclaim is a serious concern, and typically requires costly equipment. As examples, on land, coal may be stored in piles next to a power plant, and must somehow be made to enter a conveyor system. Similarly, bulk material must be rapidly removed or "reclaimed" from piles to load a ship or a barge. Conversely, a ship or a barge, once it reaches its destination, must be unloaded. All sorts of processing plants store raw material in piles, which must efficiently be "reclaimed," typically onto conveyors, for actual use. Thus, coal is just one example; the material can be any bulk material. Other examples are ore, wood chips, grain, and various food products.

In the field of bulk material reclaim, a term of art is "live" reclaim. "Live" reclaim refers to the material which comes out when a discharge gate is opened at the bottom of a stockpile. In most cases, due to "angle of reclaim," material stops flowing long before the entire stockpile is recovered, forming a "reclaim cone" of empty space. The amount of material which inherently flows before a stable "reclaim cone" is formed and flow stops is referred to as the "live" reclaim. After that, a mechanical device must be employed to move the stored material towards the opening (such as a mechanical rake, or a bulldozer), or vibration applied to assist in the flow. Prior art vibration systems, such as "vibrating drawdown hoppers" from Carman Industries, are only a partial solution.

More particularly, storage and reclaim of large quantities of bulk material on land is presently handled by several general methods, each of which has its advantages, costs, and limitations.

A first method may be described as Open or Enclosed Storage with Under-storage Reclaim. Conical, windrow, kidney shaped, and other types of material piles are formed by a number of different methods. A reclaim tunnel is provided under the stored material, with openings on top of the reclaim tunnel through which the material falls onto a reclaim conveyor below. This method has the advantage of low capital cost. Its main disadvantage is that mobile equipment is required to move the material not directly over the openings into the openings. This is a time consuming, costly and hazardous activity.

A second method may be described as Covered Slot or Inverted Cone. Slot or inverted cone storage usually requires a cover to prevent the introduction of water. The inverted cone must be steep enough to allow the material to "self clean" and be equipped with a reclaim device. The slot must also be steep enough to "self clean" but, due to the geometry, the slot can be less steep than the cone. The slot requires a reclaim rotary plow. To achieve significant storage volume, both of these structures must be very large, require significant excavation, and significant capital cost. Due to the depth of inverted cones and slots, the reclaim conveyor is also usually expensive.

A third method may be described as On Grade Storage with Mechanical Reclaimers. This type of storage can be open or covered. Some of the mechanical reclaimers in use are (1) bucket wheel reclaimers, (2) portal reclaimers, and (3) drum type reclaimers. All of these reclaimers have a relatively high capital cost and significant operating cost. Very large storage areas make covered storage not practical, which can lead to environmental issues.

Reclaim of bulk material from barges and ships has always been a capital intensive, labor intensive, and time consuming activity. Recently, self unloading ships and barges with partial reclaim systems have been developed. The systems in use are very complicated and costly requiring a large number of drawdown points and a multitude of conveyors to maintain a reasonable ship or barge capacity.

SUMMARY OF THE INVENTION

In one aspect a storage and reclaim system for bulk material is provided, including a support surface for supporting a stockpile of bulk material. The support surface is defined by a plurality of individual material support structures geometrically arranged and positioned with reference to each other so that the support surface is essentially continuous. Each of the material support structures in turn includes a dish or funnel-like structure having a generally conical floor surface sloping towards an individual discharge opening fitted with a discharge control gate. There is an array of vibrators for each of the material support structures mechanically connected to the material support structures so as to introduce vibrational energy into the dish or funnel-like structures sufficient to either avoid a stable reclaim cone or to destabilize a stable reclaim cone which may form in order to maintain material discharge flow while the discharge control gate is open.

In another aspect, a watercraft for transporting bulk material cargo is provided. The watercraft includes a hull defining an interior space having a bottom, and a storage and reclaim system supported within the hull. The storage and reclaim system includes a support surface for supporting a stockpile of bulk material, the support surface being defined by a plurality of individual material support structures geometrically arranged and positioned with reference to each other so that the support surface is essentially continuous. Each of the material support structures in turn includes a dish or funnel-like structure having a generally conical floor surface sloping towards an individual discharge opening fitted with a discharge control gate. There is an array of vibrators for each of the material support structures mechanically connected to the material support structures so as to introduce vibrational energy into the dish or funnel-like structures sufficient to either avoid a stable reclaim cone or to destabilize a stable reclaim cone which may form in order to maintain material discharge flow while the discharge control gate is open. The dish or funnel-like structures are supported within the hull in a manner such that there is a space below the dish or funnel-like structures and above the interior space bottom so as to accommodate vibration of the dish or funnel-like structures. At least one reclaim conveyor is located below the support surface and above the interior space bottom so as to receive bulk material discharged through at least one of the discharge openings and to convey the bulk material to another location for unloading the watercraft.

In yet another aspect, a method for storing and reclaiming bulk material is provided. The method includes the step of providing a storage and reclaim system, the storage and reclaim system including a support surface for supporting a stockpile of bulk material. The support surface is defined by a plurality of individual material support structures geometrically arranged and positioned with reference to each other so that the support surface is essentially continuous. Each of the material support structures in turn includes a dish or funnel-like structure having a generally conical floor surface sloping towards an individual discharge opening fitted with a discharge control gate. There is an array of vibrators for each of the material support structures mechanically connected to the material support structures so as to introduce vibrational energy into the dish or funnel-like structures. The method further includes building a stockpile of bulk material on the support surface, opening the discharge control gates when it is desired to reclaim bulk material, and conveying away bulk material discharged through the discharge openings. The vibrators are operated as needed in order to either avoid a stable reclaim cone or to destabilize a stable reclaim cone which may form in order to maintain material discharge flow while the discharge control gates are open.

DETAILED DESCRIPTION

In overview, embodiments of the invention provide systems and methods by which an essentially unlimited amount of bulk material of many types can be stored over storage areas essentially unlimited in area and reclaimed without the use of mobile equipment or expensive prior-art reclaimers. Extensive excavation during the construction of storage and reclaim systems embodying the invention is not required. The invention may be embodied in self-unloading ships and barges which are uncomplicated and relatively inexpensive. Embodiments of the invention allow ships and barges transporting bulk material to self-unload while maintaining lateral and longitudinal trim, and moreover allow barges to be unloaded while rafted.

Embodiments of the invention thus provide a relatively large, approximately flat, storage area, for a single large stockpile of bulk material. The storage area takes the form of what is herein termed a support surface, which is in turn made up of or defined by a plurality of individual material support structures geometrically arranged and positioned with reference to each other so that the support surface is essentially continuous. In the disclosed embodiments, the individual material support structures are simply square in plan view, and the support surface is rectangular in plan view.

Figure 1:
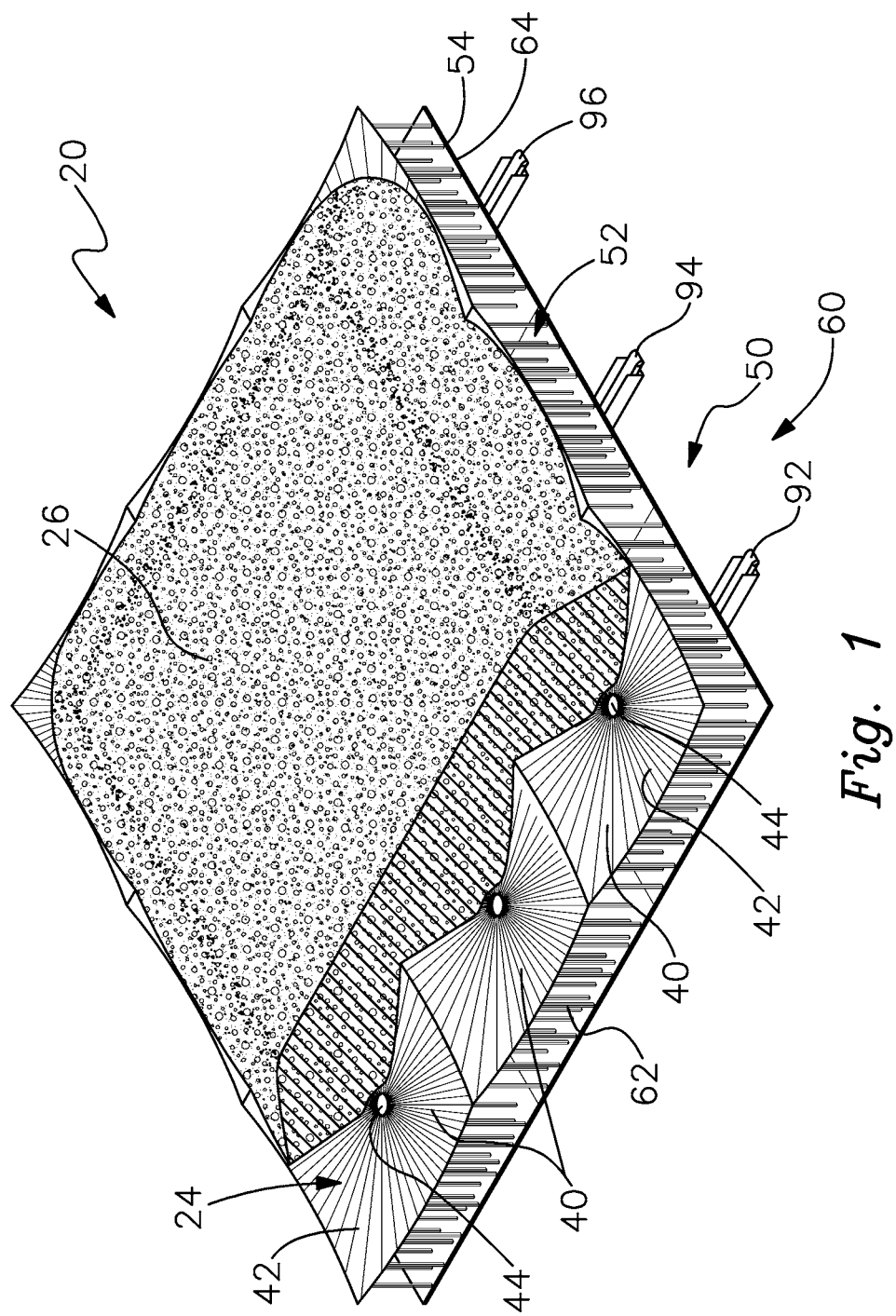
FIG. 1 is a representative three-dimensional view of a storage and reclaim system for bulk material embodying the invention, with a stockpile of bulk material partially broken away, wherein nine material support structures are arranged in a 3×3 pattern to define an overall support surface supporting the stockpile.

Referring now to the drawings, FIG. 1 is a three-dimensional representation of a land-based storage and reclaim system 20 embodying the invention, and FIGS. 2-6 illustrate another land-based storage and reclaim system 22 embodying the invention. The storage and reclaim system 20 of FIG. 1 and the storage and reclaim system 22 of FIGS. 2-6 differ primarily in the number of individual material support structures defining the overall storage area. In the system 20 of FIG. 1, nine material support structures are arranged in a 3×3 pattern. In the system 22 of FIGS. 2-6, four material support structures are arranged in a 2×2 pattern. In view of the similarities, the system 20 of FIG. 1 and the system 22 of FIGS. 2-6 are generally described together hereinbelow, generally employing identical reference numbers for corresponding elements, and with differences noted where applicable.

In FIG. 1, the storage and reclaim system 20 includes an overall support surface 24 supporting a single stockpile 26 of bulk material, shown partially broken away. Likewise, the storage and reclaim system 22 of FIGS. 2-6 includes an overall support surface 28 supporting a single stockpile 30 of bulk material. The system 22 includes a roof 32 protecting the stockpile 30, supported on longitudinal sidewalls 34 and 36. Endwalls 38 aid in containing the stockpile 30.

Each support surface 24 or 28 is defined by a plurality of individual material support structures 40 geometrically arranged and positioned with reference to each other so that the support surfaces 24 (FIG. 1) and 28 (FIGS. 2-6) are essentially continuous. Thus, the individual material support structures 40 are at least adjacent and close enough to each other so the material does not fall between the individual material support structures 40. Preferably, in order to accommodate expansion and contraction, the edges of the individual material support structures 40 overlap each other in a sliding manner (not shown).

In the particular embodiments illustrated herein, the individual material support structures 40 are square in plan view. In the system 20 of FIG. 1, the individual material support structures 40 are arranged in a 3×3 configuration so that the overall support surface 24 is also square in plan view. Similarly, in the system 22 of FIGS. 2-6, the individual material support structures 40 are arranged in a 3×3 configuration so that the overall support structure 28 is square in plan view. These are examples only; various rectangular configurations of overall material support structures can be constructed.

Typical dimensions for the individual material support structures 40 are 200 feet by 200 feet (approximately 60 meters by 60 meters) square to 300 by 300 feet (approximately 90 meters by 90 meters square). Accordingly, the overall material support surface 24 in the system of FIG. 1 may be 900 by 900 feet (approximately 270 by 270 meters) square. The overall material support surface 28 in the embodiment of FIGS. 2-6 may be 400 feet by 400 feet (approximately 120 by 120 meters) square. It will be appreciated that the 3×3 and 2×2 configurations, as well as the particular dimensions, are by way of example only; greater or smaller numbers of individual material support structures 40 may be provided. Accordingly, the stockpile 26 or 30 can be quite large, and conceptually is unlimited in area, as additional individual material support structures 40 are provided.

Although the individual material support structures 40 in the embodiments disclosed herein are square in plan view, it will be appreciated that other geometric shapes may be employed, so long as an essentially continuous support surface is defined when the individual material support structures are fitted together. For example, individual material support structures which are triangular in plan view may be employed. Related to that, depending upon the particular geometrical configuration employed, the individual material support structures do not all need to be the same size and shape.

Each of the individual material support structures 40 takes the form of a dish or funnel-like structure 40 having a generally conical floor surface 42 sloping towards an individual discharge opening 44. (Since the material support structures 40 are square in plan view, more accurately intersections of the material support structures with horizontal planes define circles of increasing diameter as plane height increases, becoming arcuate segments of circles near the corners.) The slope of the conical floor surface 42 is relatively shallow, at an angle of between 5° to 12° relative to horizontal. The surface 42 preferably is made of a material which has a relatively low coefficient of friction, such as polished stainless steel, or a plastic material such as TIVAR® 88 Ultra High Molecular Weight Polyethylene (UHMWPE).

As employed herein, the terminology "generally conical" refers to any approximation of a cone. Thus, the generally conical floor surface may be fabricated as a plurality of planar pieces, such as a plurality of sloping planar triangular pieces, with as few as four sloping planar triangular pieces where the individual material support structures are square in plan view, although not presently preferred. (In that case intersections of the material support structures with horizontal planes define squares of increasing size as plane height increases.) In the example (not illustrated) of individual material support structures which are triangular in plan view, each individual material support structure may be made of three sloping planar triangular pieces. Related to this discussion of approximations of a cone, a circle can be approximated by a plurality of straight line segments, with the limiting case of an actual circle being an infinite number of infinitely short line segments. Typically the material support structures 40 are fabricated of sheet material cut and bent as required.

Figure 3:
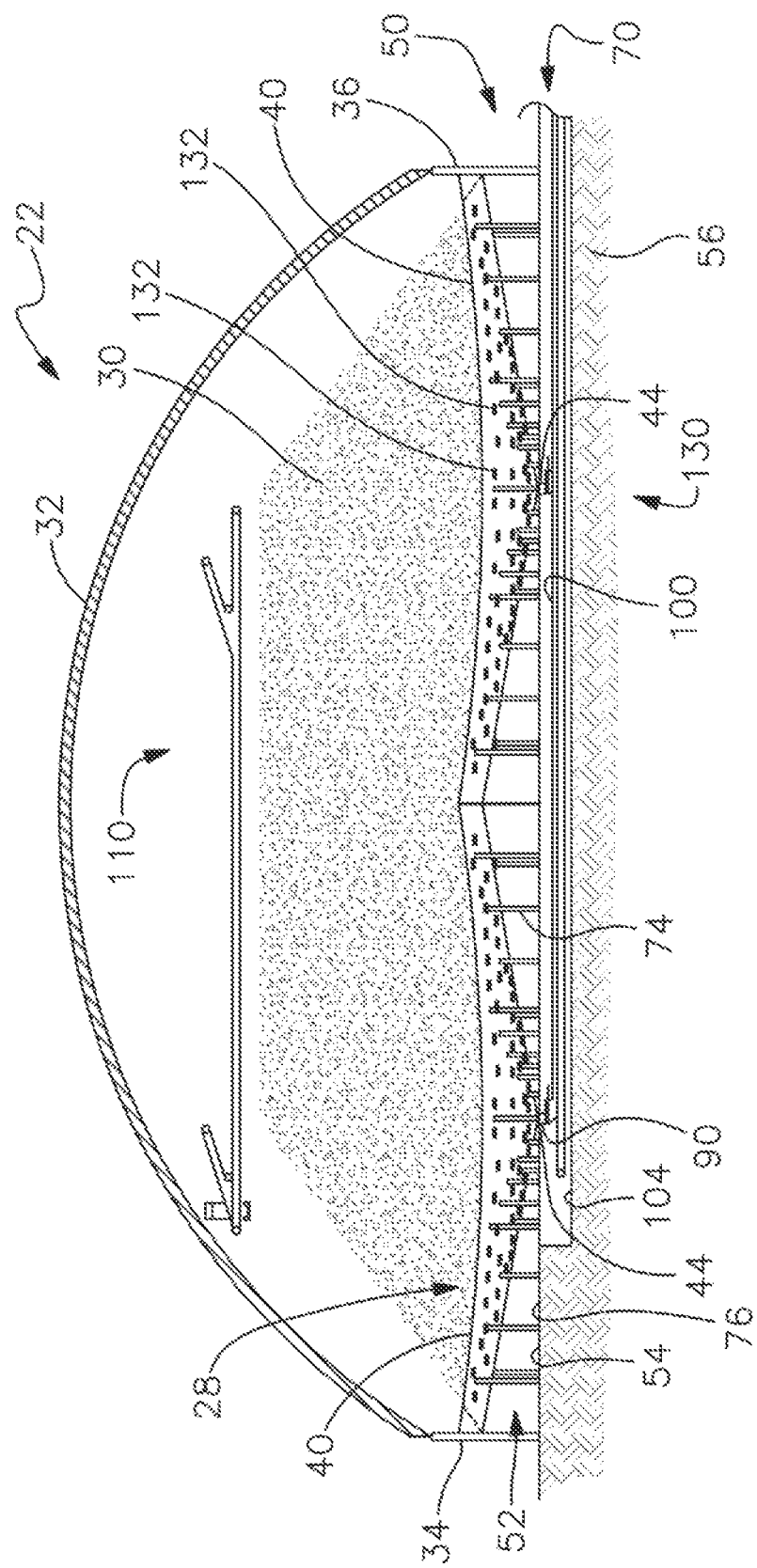
FIG. 3 is a side cross-sectional view taken on line 3-3 of FIG. 2.
Figure 4:
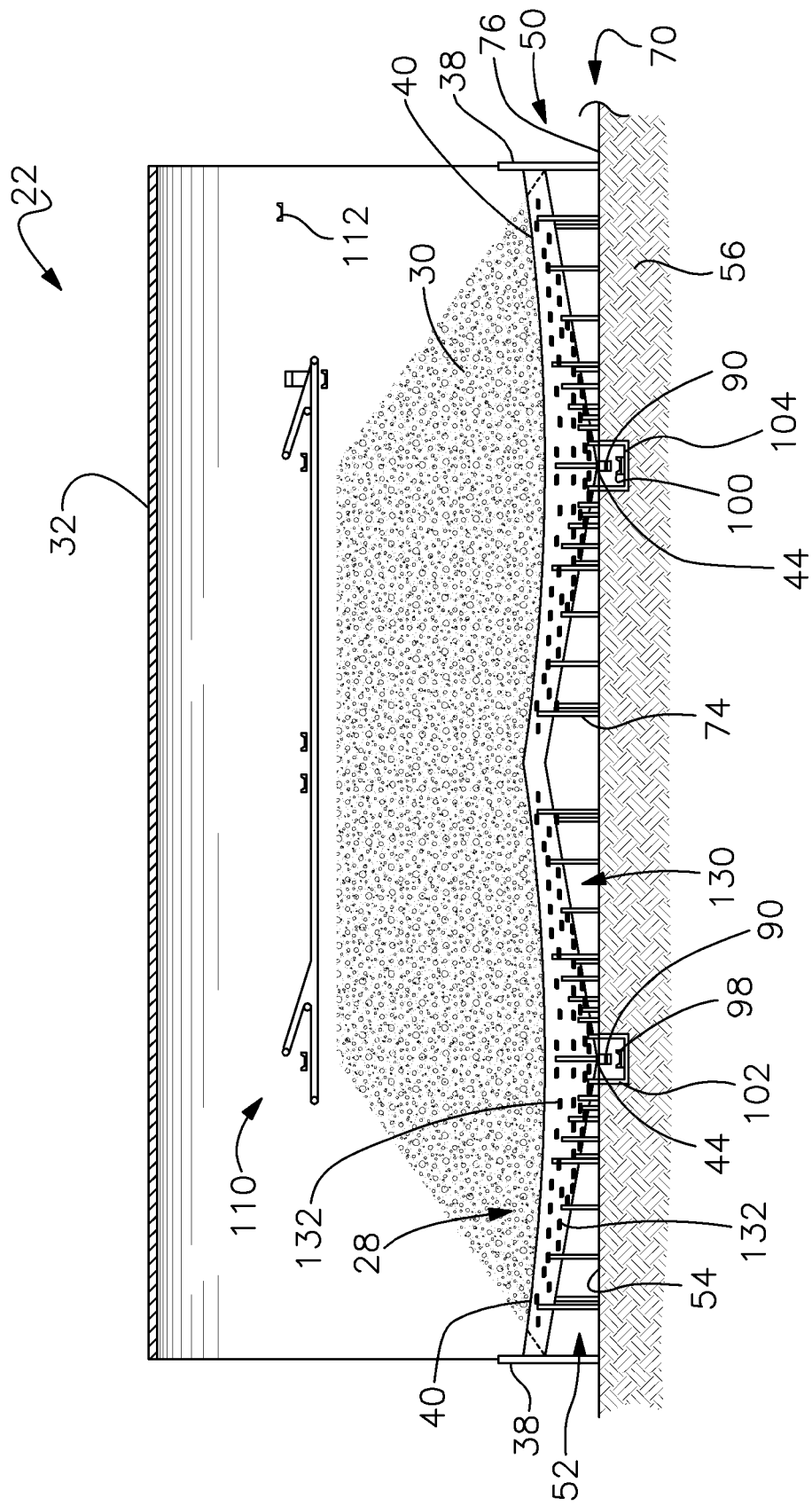
FIG. 4 is a similar side cross-sectional view taken on line 4-4 of FIG. 2.
Figure 5:
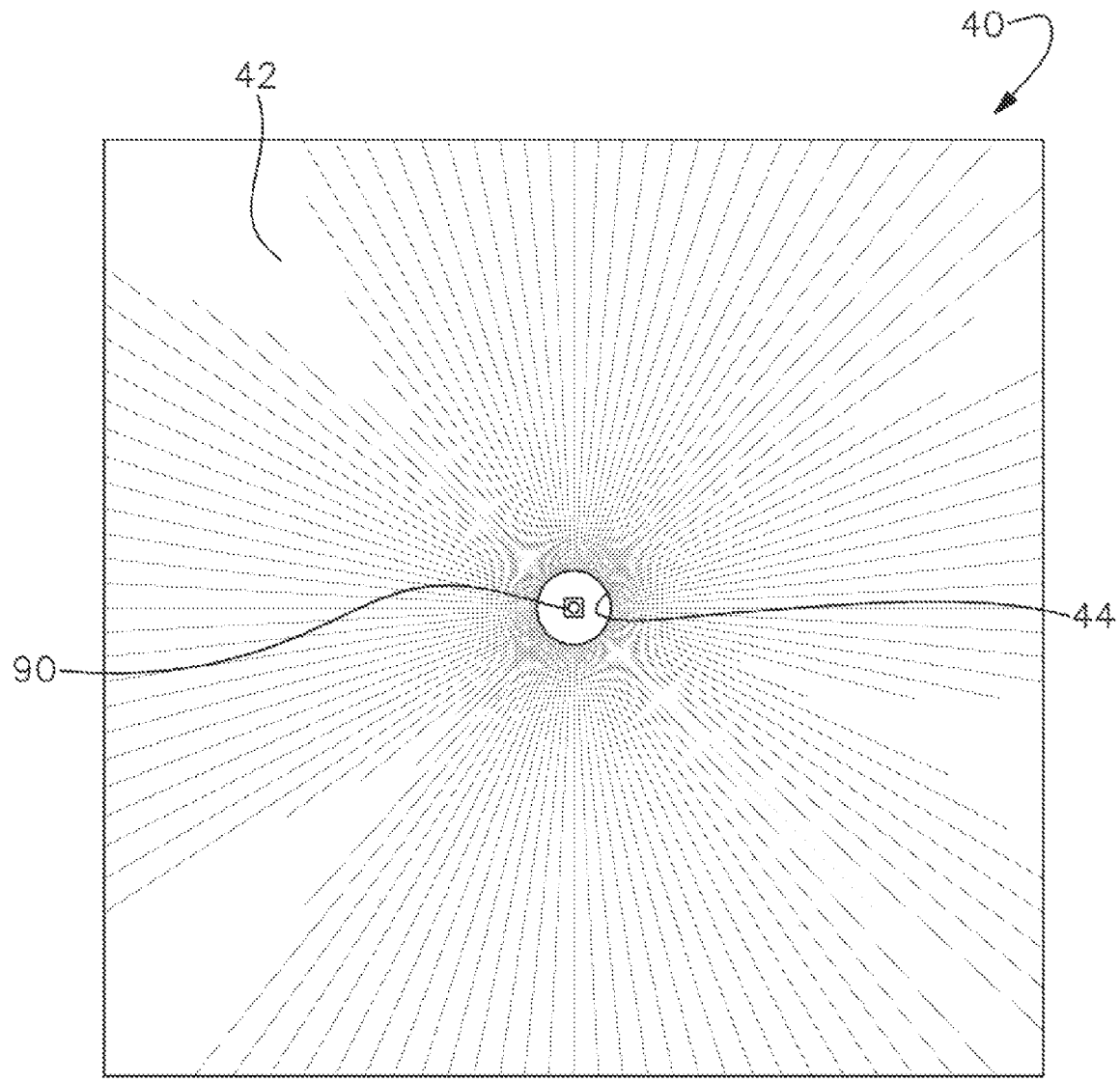
FIG. 5 is top view of one of the individual material support structures of the embodiment of FIGS. 2-4.

Whatever the particular configuration of the individual material support structures 40, a structural support system, generally designated 50, is provided below each of the individual support structures 40, defining a space 52 below the material support structures 40 and above an underlying base 54, representing, in the case of the land-based systems 20 and 22, ground or a stable structure built on the ground, such as a concrete slab 56 (FIGS. 3 and 4).

In the system 20 of FIG. 1, a structural support system 60 more particularly is represented as a plurality of pillars 62 extending upwardly from a support base 64.

In the system 22 of FIGS. 2-6, a structural support system 70 takes the form of spaced support beams 72 (FIG. 6) supported on pillars 74. (For clarity of illustration, the spaced support beams 72 are omitted from FIGS. 3 and 4, although the pillars 74 are shown in FIGS. 3 and 4.) The pillars 74 extend upwardly from a support base 76, for example the concrete slab 56.

Figure 6:
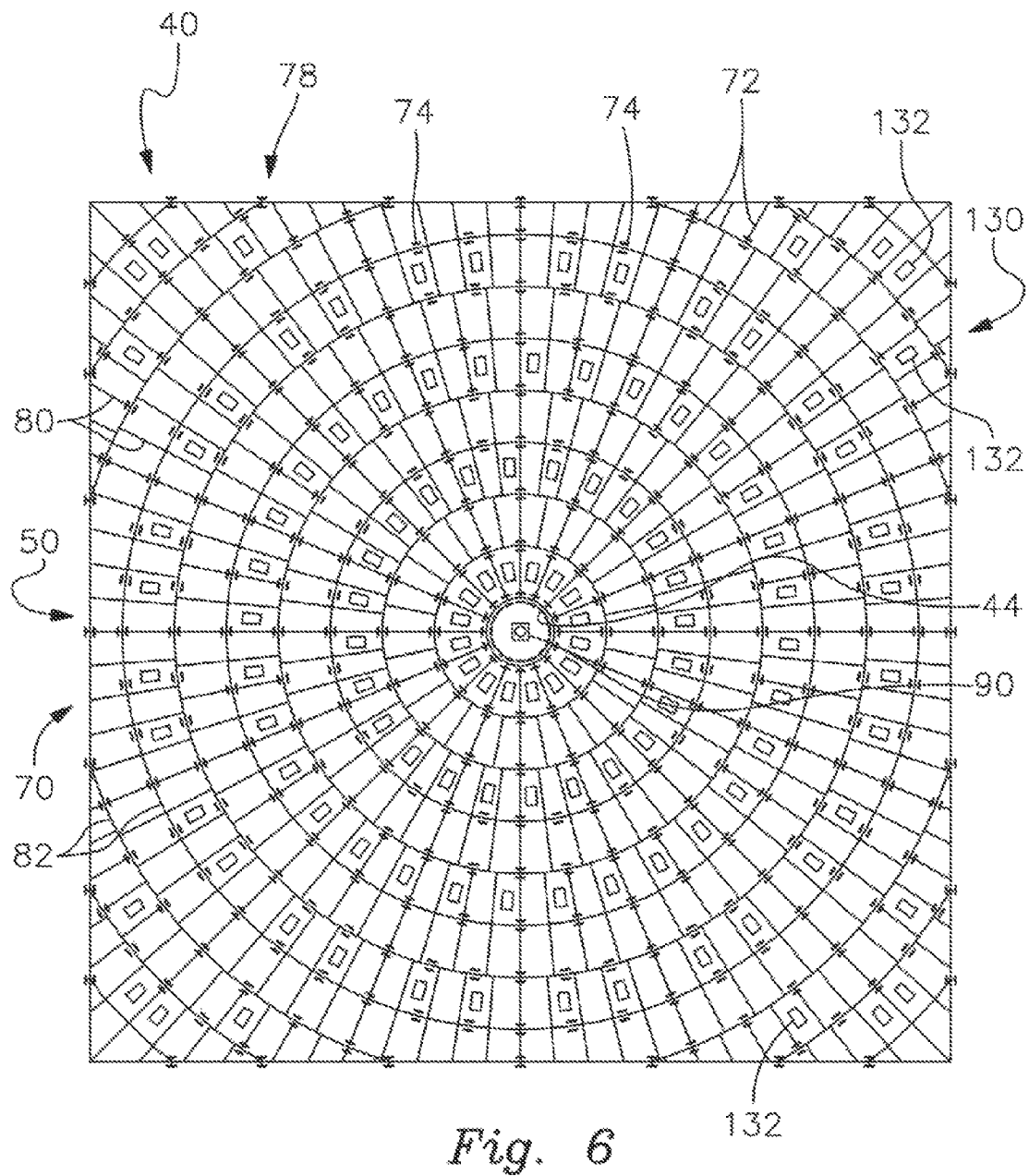
FIG. 6 is a bottom view of the material support structure of FIG. 5.

With particular reference to FIG. 6, the spaced support beams 72 are arranged in a grid 78 of sloped radial beams 80 having a slope corresponding to the slope of the conical floor surface 42, and a plurality of generally concentric beams 82 lying in individual horizontal planes. The support beams 72 and pillars 74 are structurally engineered so as to support the material support structure under the weight of the stockpile 26.

Each discharge opening 44 is fitted with a discharge control gate 90 (FIGS. 3 and 4) of conventional construction which is opened and closed to selectively allow material to flow out through the respective discharge opening 44.

In the storage and reclaim system 20 of FIG. 1, three reclaim conveyors 92, 94 and 96 are provided, located so as to receive bulk material discharged through the discharge openings 44 when the discharge control gates 90 are opened. Each of the three reclaim conveyors, 92, 94 and 96 conveys material discharged through three of the nine discharge openings 44 in the system 20 of FIG. 1. Likewise, in the storage and reclaim system 22 of FIGS. 2-6, two reclaim conveyors 98 and 100 are provided, again located so as to receive bulk material discharged through the discharge openings 44 when the discharge control gates 90 are opened. Each of the two reclaim conveyors 98 and 100 conveys material discharged through two of the four discharge openings 44 in the system 22 of FIGS. 2-6. The reclaim conveyors 92, 94, 96 or 98, 100 convey bulk material to another location (not shown) in a conventional matter. In FIGS. 3 and 4, the reclaim conveyors 98 and 100 are shown installed in respective troughs 102 and 104, the troughs 102 and 104 being formed in the concrete slab 56.

Figure 2:
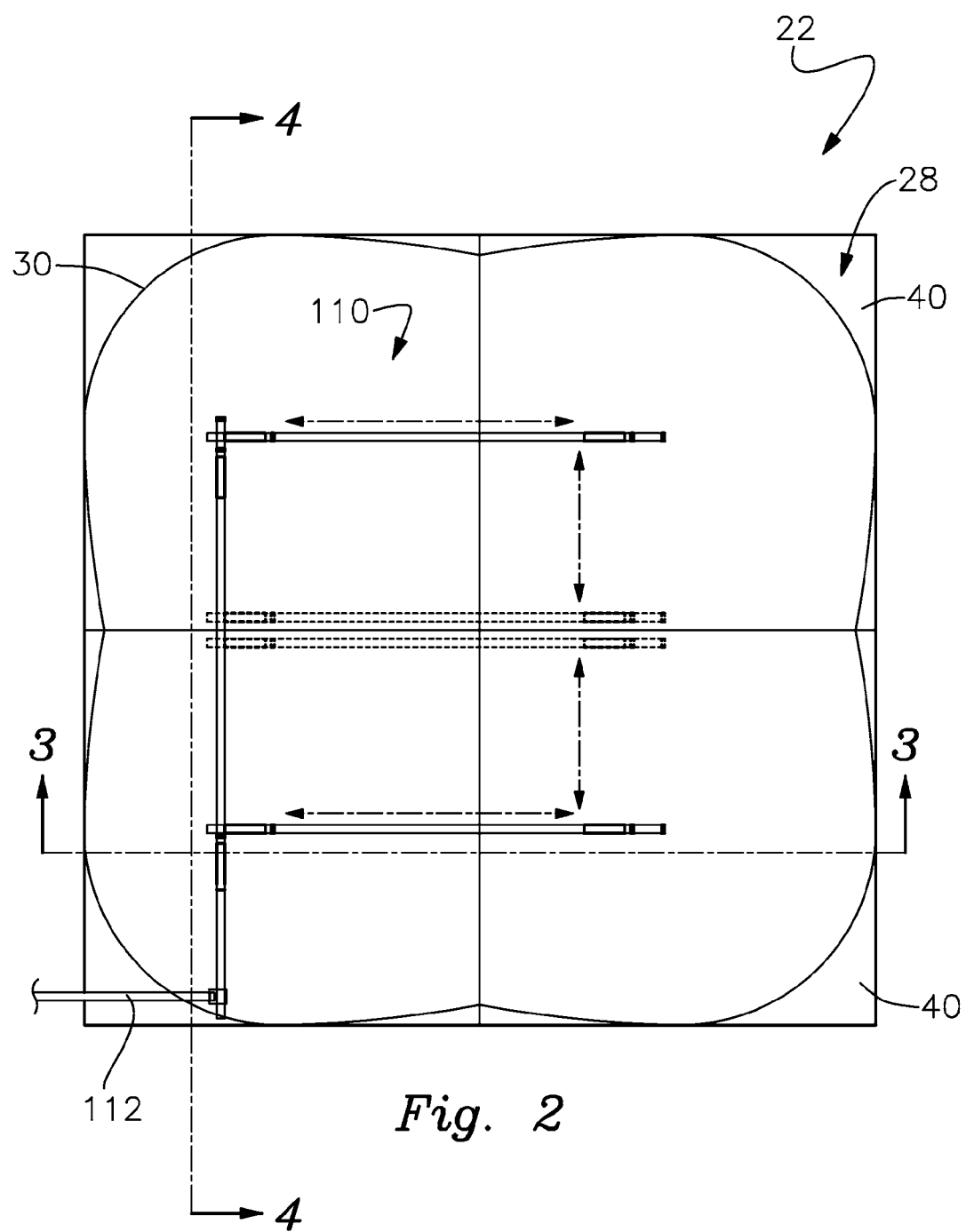
FIG. 2 is a plan view of another storage and reclaim system embodying the invention, with the enclosure or roof structure omitted from the drawing, wherein four material support structures are arranged in a 2×2 pattern to define an overall support surface.

With particular reference to FIGS. 2-4, for building the stockpile 26 of bulk material, an overhead storage tripper feed conveyor system generally designated 110 is provided, which receives feed stock from a storage feed conveyor 112. For clarity of illustration, structural support for the conveyor system 110 is not shown. In order to fully utilize the capacity of the storage and reclaim system 22, it is necessary to load the support surface 24 (FIG. 1) or support surface 28 (FIGS. 2-4) with material in the manner shown in FIG. 1 with reference to the stockpile 26. This allows material to be stored over a large area with a reasonable elevation of the top of the stored material stockpile 26 or 30. By way of example and not limitation of a system for building a stockpile, the overhead storage tripper feed conveyor system 110 includes a series of conventional mobile trippers mounted on traversing conveyors. This allows the discharge point of each tripper to be located anywhere over the entire area where the stockpile 26 or 30 is to be built. In the event columns (not shown) are required to support the roof 32, multiple mobile trippers and mobile tripper conveyors may be required. All the mobile tripper conveyors are fed by one storage conveyor equipped with mobile trippers to feed the mobile tripper conveyors.

Figure 7:
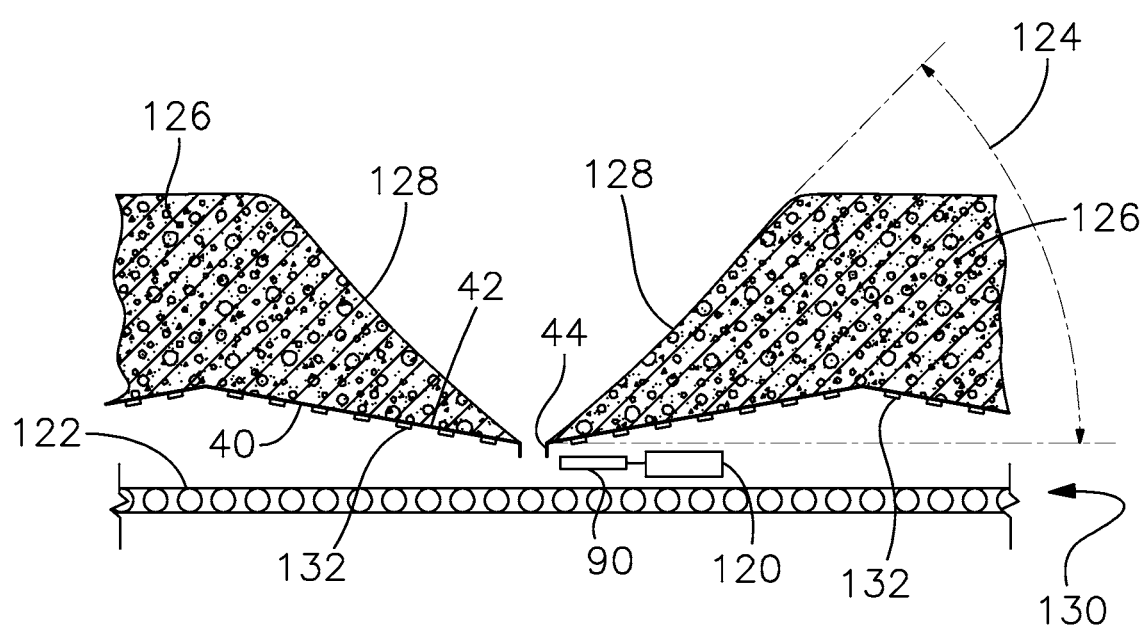
FIG. 7 depicts a stable reclaim cone in view of the angle of reclaim.
Figure 8:
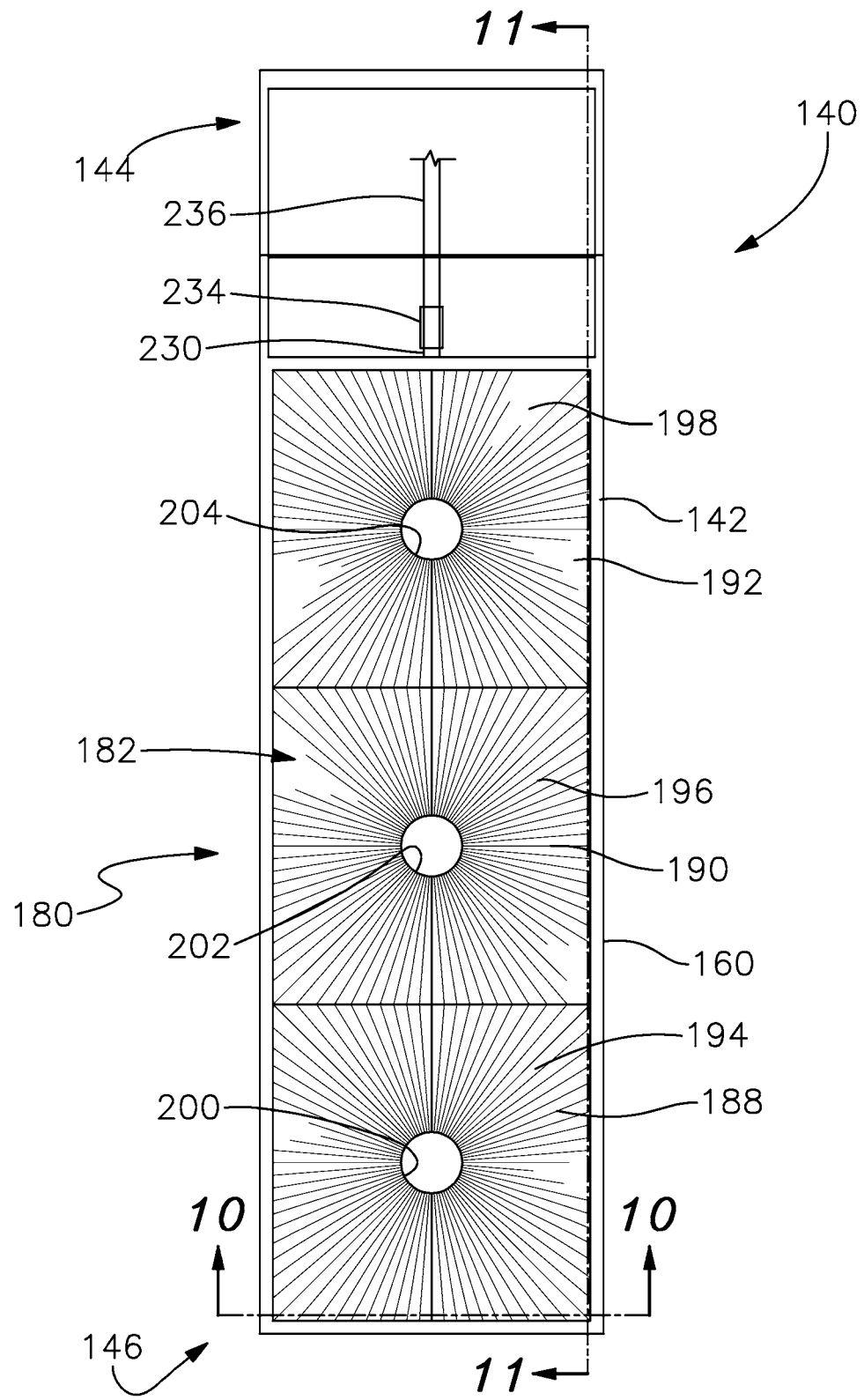
FIG. 8 is a plan view illustrating yet another embodiment of the invention, in the form of an inland hopper barge representing a watercraft for transporting bulk material cargo, and including three material support structures arranged in a line along the length of the barge.

As thus far described, the "live" reclaim capacity of the systems 20 and 22 of FIG. 1 and FIGS. 2-6 is limited. Thus, and with reference to FIG. 7, due to the "angle of reclaim" there is a limit on how much of the stockpile 26 or 30 can be recovered onto the reclaim conveyors 92, 94, 96 or 98, 100 simply by opening the discharge control gates 90. "Angle of reclaim" is a well-known engineering property of granular materials, defined as the angle of a stable slope, generally determined by friction, cohesion, and the shapes of the particles, achieved while withdrawing material from the bottom of a pile of stored material. FIG. 7 illustrates a situation where the discharge control gate 90 has been opened by an actuator 120, thereby allowing material to flow through the discharge opening 44 onto an exemplary reclaim conveyor 122. An exemplary angle of reclaim is represented in FIG. 7 as angle 124.

In the particular condition illustrated in FIG. 7, bulk material from a stockpile 126 representative of either of the stockpiles 26 or 30 has stopped flowing, resulting in a stable reclaim cone 128 surrounding empty air space. The amount of material which previously occupied the space within the FIG. 7 stable reclaim cone 128, in other words the material which comes out when the discharge control gate 90 is opened, is what is known as "live" reclaim from a pile of stored bulk material, and is less than the entire stockpile 126.

Embodiments of the invention employ an array 130 of vibrators 132 for each of the material support structures 40 mechanically connected to the material support structures 40 so as to introduce vibrational energy into the dish or funnel-like structures 40 sufficient to either avoid a stable reclaim cone, or to destabilize a stable reclaim cone which may form, in order to maintain material discharge flow while the discharge control gate 90 is open. The vibrators 132 are visible and represented in FIGS. 2, 4, 6 and 7. Vibration of the dish or funnel-like structures 40 is accommodated by the spaces 52 below the dish or funnel-like structures 40 and above the underlying base 54. Typically, the vibrators 132 are operated only as needed to destabilize a stable reclaim cone which has formed, although continuous or other intermittent operation is possible. In typical embodiments a flow switch (not shown) is employed to recognize a non-flow condition and activate the vibrators 132.

As the stockpile 26, 30 or 124 is nearly recovered, leaving just a small quantity of bulk material on the support surface 24 or 28, the operation reduces to that of a vibrating feeder, allowing substantially all of the bulk material to pass through the discharge openings 44. However, prior to that point, the mode of operation is distinct from that of a vibrating feeder.

As illustrated in FIG. 6, in the disclosed embodiment the vibrators 132 are mechanically connected to the undersides of the dish or funnel-like structures 40 at selected locations intermediate the pillars 74 and intermediate the support beams 72. The vibrators 132 more particularly are rotary electric vibrators such as a Model Number RE 13-6 Rotary Electric Vibrator manufactured by The Cleveland Vibrator Company. This vibrator rotates at 1,145 RPM, is powered by a 1.1 HP motor and produces 2,860 lbs of force. Different installations of varying geometry and storage capacities require different vibrators. It will be appreciated that the vibrators may be powered by energy sources other than electricity.

Figure 9:
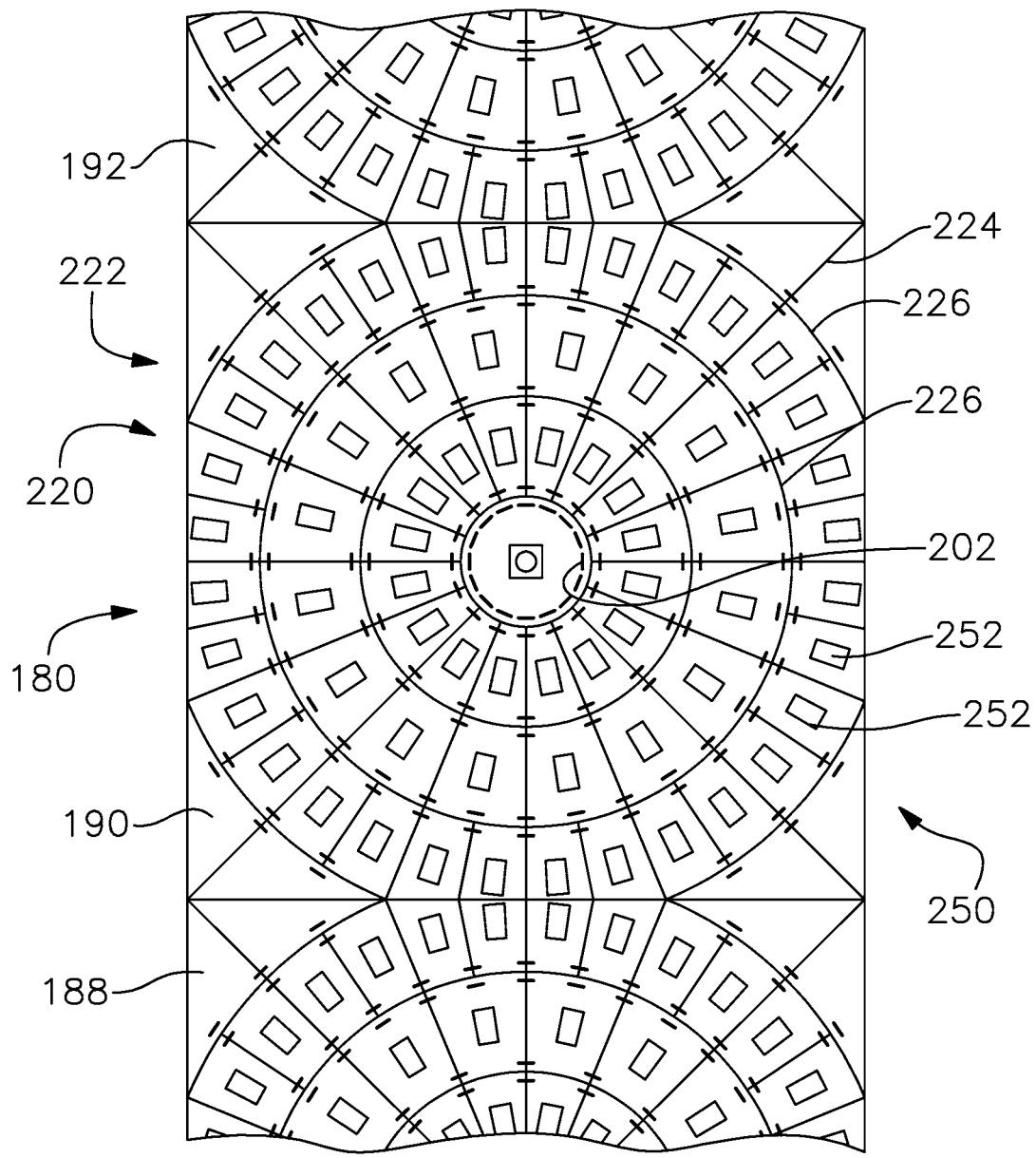
FIG. 9 is an underside view of the middle material support structure in the embodiment of FIG. 8, with portions of adjacent material support structures visible.
Figure 10:
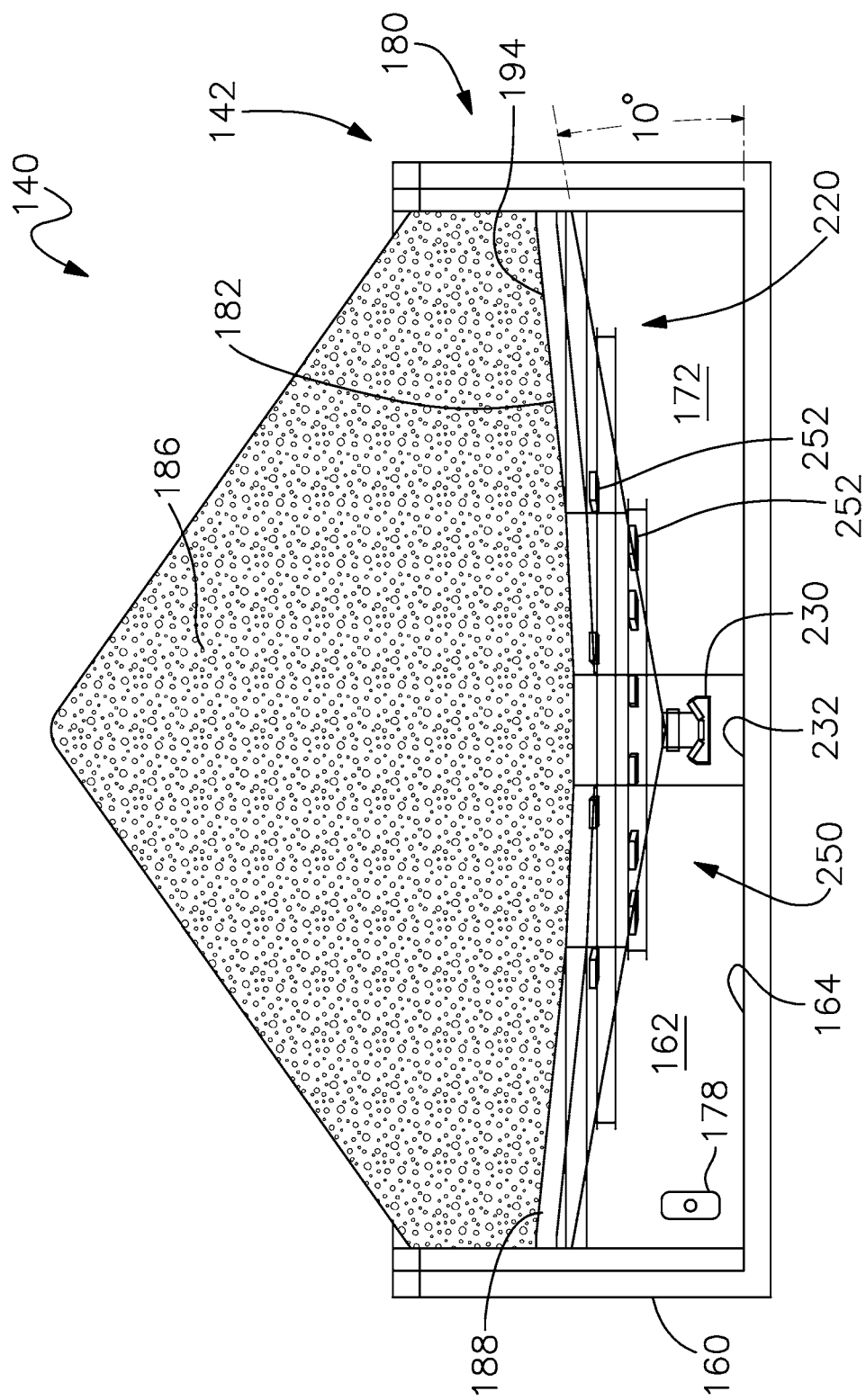
FIG. 10 is a cross-sectional view taken on line 10-10 of FIG. 8.
Figure 11:
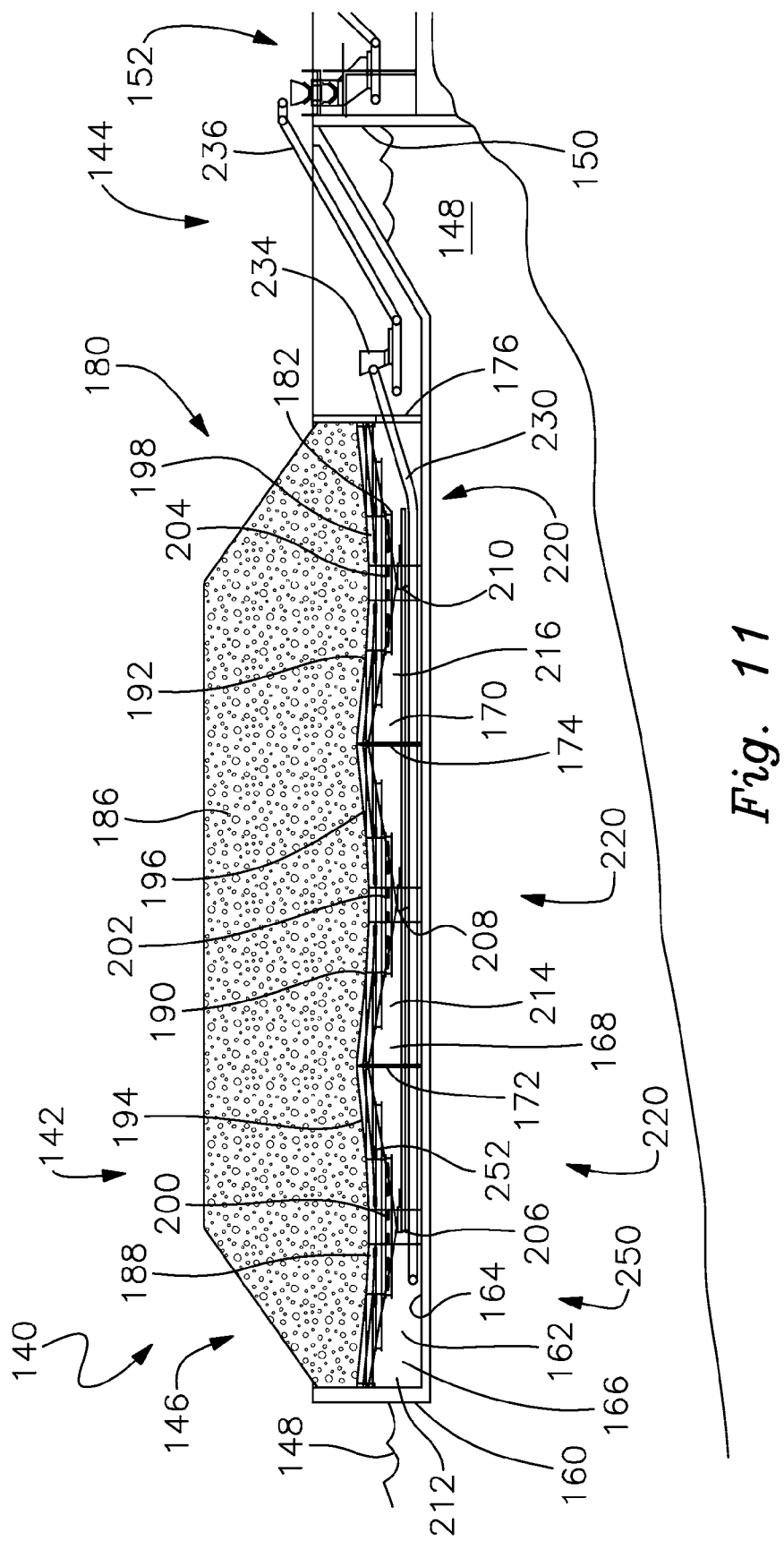
FIG. 11 is a cross-sectional view taken generally on line 11-11 of FIG. 8, and additionally showing a dock where the barge is being unloaded.

Referring now to FIGS. 8-11, a watercraft embodying the invention is generally designated 140 and more particularly is illustrated as an inland hopper barge 142 having a bow 144 and a stern 146. The watercraft 140 may also be an ocean-going ship. In FIG. 11, the barge 146 is illustrated as floating in water 148 at an unloading dock 150 equipped with a receiving conveyor system 152.

The barge 142 has a hull 160 defining an interior space 162 having a bottom 164. The interior space 162 is divided into compartments 166, 168 and 170 by bulkheads 172, 174 and 176. In FIG. 10, a watertight access hatch 178 is visible in the bulkhead 172.

Supported within the hull 160 is a storage and reclaim system 180, essentially identical to the storage and reclaim systems 20 and 22 described hereinabove, except for being part of the watercraft 150. Thus, the storage and reclaim system 180 includes an overall support surface 182 supporting a single stockpile 186 of bulk material, such as coal. The support surface 182 is defined by a plurality of individual material support structures 188, 190 and 192 each corresponding to the material support structures 40 described in detail hereinabove, geometrically arranged and positioned with reference to each other so that the support surface 182 is essentially continuous. In the system 180 of FIGS. 8-11, the material support structures 188, 190 and 192 are arranged in a 1×3 pattern, in other words, in a straight line, consistent with the usual shape of an inland hopper barge. The overall support surface accordingly is rectangular but not square.

As in the embodiments described hereinabove, each of the individual material support structures 188, 190 and 192 takes the form of a dish or funnel-like structure having a generally conical floor surface 194, 196 or 198 sloping towards individual discharge openings 200, 202 and 204. The discharge openings 200, 202 and 204 are fitted with corresponding discharge control gates 206, 208 and 210.

The dish or funnel-like structures 188, 190 and 192 are supported within the hull 160 in a manner such that there are spaces 212, 214 and 216 below the dish or funnel-like structures 194, 196 and 198 and above the bottom 164. With particular reference to FIG. 9, structural support systems 220 are provided, each more particularly comprising a grid 222 of sloped radial beams 224 having a slope corresponding to the slope of the conical floor surfaces 194, 196 and 198, and a plurality of generally concentric beams 226 lying in individual horizontal planes.

With reference to FIGS. 10 and 11, a single reclaim conveyor 230 is located within a reclaim conveyor tunnel 232 (FIG. 10) which is provided with a sump pump (not shown). The reclaim conveyor 230 is located below the discharge openings 200, 202 and 204 so as to receive bulk material discharged when the discharge control gates 206, 208 and 210 are opened.

With particular reference to FIG. 11, the reclaim conveyor 230 discharges into a transfer chute 234, which in turn transfers material to an unloading conveyor 236, which in turn unloads material onto the receiving conveyor system 152 of the dock 156.

In the same manner as described hereinabove with reference to the systems 20 and 22, an array 250 of vibrators 252 is provided for each of the material support structures 188, 190 and 192 mechanically connected to the material support structures 188, 190 and 192 so as to introduce vibrational energy into the dish or funnel-like structures 188, 190 and 192 so as to introduce vibrational energy sufficient to either avoid a stable reclaim cone, or to destabilize a stable reclaim cone which may form, in order to maintain material discharge flow while the discharge control gates 206, 208 and 210 are open with particular reference to FIG. 9.

During the unloading process, longitudinal trim of the barge 152 can be maintained by individual control of the discharge control gates 206, 208 and 210. Lateral trim is maintained automatically.

Moreover, barges can be arranged so that, during unloading, bulk material discharge at the bow 144 of one barge is fed into the stern 146 of the barge ahead. By using a collecting conveyor (not shown) parallel to the bow of a raft of barge (not shown), an entire raft can be unloaded without breaking the raft.

When a storage and reclaim system embodying the invention is installed in a ship, it is anticipated that a 100,000 ton vessel can be unloaded in less than eighteen hours.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A storage and reclaim system for bulk material, said system comprising:
   a support surface for supporting a stockpile of bulk material, said support surface being defined by a plurality of individual material support structures geometrically arranged and positioned with reference to each other so that the support surface defines a continuous structure;

each of the material support structures in turn comprises a funnel-like structure having a floor surface sloping towards a corresponding discharge opening fitted with a discharge control gate;
a flow switch for detecting a state of non-flow of the bulk material through a corresponding discharge control gate; and
an array of vibrators for each of the material support structures mechanically connected to the material support structures so as to introduce vibrational energy into the funnel-like structures sufficient to either avoid a stable reclaim cone or to destabilize a stable reclaim cone which may form in order to maintain material discharge flow when the corresponding discharge control gate is opened; and
wherein each conical floor surface has a slope of 5 to 12 degrees relative to horizontal such that the slope is too shallow for the bulk material to flow by gravity apart from the vibrational energy.

2. The system of claim 1, wherein each of the material support structures comprises a four-sided polygon in plan view, and the support surface is rectangular in plan view.

3. The system of claim 1, wherein the conical floor surface of each of the material support structures has a slope at an angle of approximately 10 degrees relative to horizontal.

4. The system of claim 1, which further comprises at least one reclaim conveyor below said support surface, said at least one reclaim conveyor located so as to receive bulk material discharged through at least one of said discharge openings and to convey the bulk material to another location.

5. The system of claim 4, which is located on land; and wherein said at least one reclaim conveyor is located in a trough.

6. The system of claim 1, which further comprises a storage tripper feed conveyor system spaced a distance above said support surface for building the pile of bulk material.

7. The system of claim 1, which further comprises a structural support system below the funnel-like structures which together define the support surface, the structural support system providing a space below the funnel-like structures so as to accommodate vibration of the funnel-like structures.

8. The system of claim 7, wherein said structural support system comprises a plurality of spaced pillars.

9. The system of claim 7, wherein said structural support system comprises spaced support beams supported on pillars.

10. The system of claim 9, wherein said support beams are arranged in a grid comprising a plurality of sloped radial beams and a plurality of concentric beams lying in individual horizontal planes.

11. The system of claim 10, wherein the vibrators are mechanically connected to undersides of the funnel-like structures at selected locations intermediate the support beams.

12. The system of claim 9, wherein the vibrators are mechanically connected to undersides of the funnel-like structures at selected locations intermediate the pillars.

13. The system of claim 1, which is located on land.

14. The system of claim 1, which is located on a watercraft.

15. The system of claim 1, wherein:
the bulk material has an angle of reclaim that is greater than 30 degrees;
the bulk material is a carbonaceous bulk material; and
the array of vibrators for each of the material support structures is configured to activate so as to introduce vibrational energy into the funnel-like structures when a flow switch detects a state of non-flow.

16. The system of claim 15, wherein the carbonaceous bulk material is ore or coal.

17. The system of claim 15, wherein the carbonaceous bulk material is wood chips or grain.

18. A watercraft for transporting bulk material cargo, said watercraft comprising:
a hull defining an interior space having a bottom; and
a storage and reclaim system comprising:
a support surface for supporting a stockpile of bulk material, the support surface being defined by a plurality of individual material support structures geometrically arranged and positioned with reference to each other so that the support surface is essentially continuous,
and wherein each of the material support structures in turn comprises a funnel-like structure having a generally conical floor surface sloping towards a corresponding discharge opening fitted with a discharge control gate,
an array of vibrators for each of the material support structures mechanically connected to the material support structures so as to introduce vibrational energy into the funnel-like structures sufficient to either avoid a stable reclaim cone or to destabilize a stable reclaim cone which may form in order to maintain material discharge flow when the corresponding discharge control gate is open,
and wherein each of the funnel-like structures is supported within the hull in a manner such that there is a space below each of the funnel-like structures and above the interior space bottom so as to accommodate vibration of the funnel-like structures,
a flow switch for detecting a state of non-flow of the bulk material through a discharge control gate, and
at least one reclaim conveyor below the support surface and above the interior space bottom and located so as to receive bulk material discharged through at least one of the discharge openings and to convey the bulk material to another location for unloading the watercraft; and
wherein each conical floor surface has a slope of 5 to 12 degrees relative to horizontal such that the slope is too shallow for the bulk material to flow by gravity apart from the vibrational energy.

* * * * *